D. A. YORK.
RESILIENT TIRE.
APPLICATION FILED DEC. 7, 1912.
1,077,782.
Patented Nov. 4, 1913.
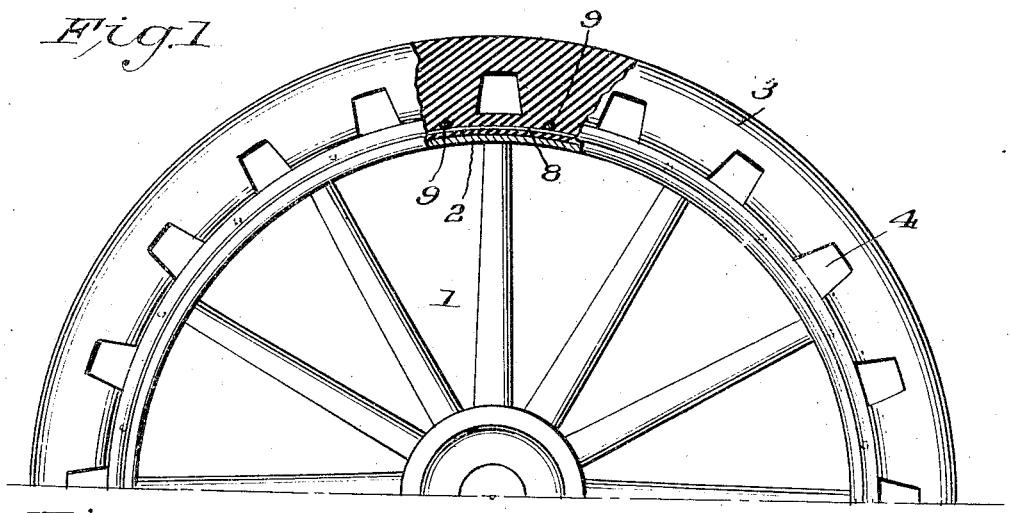
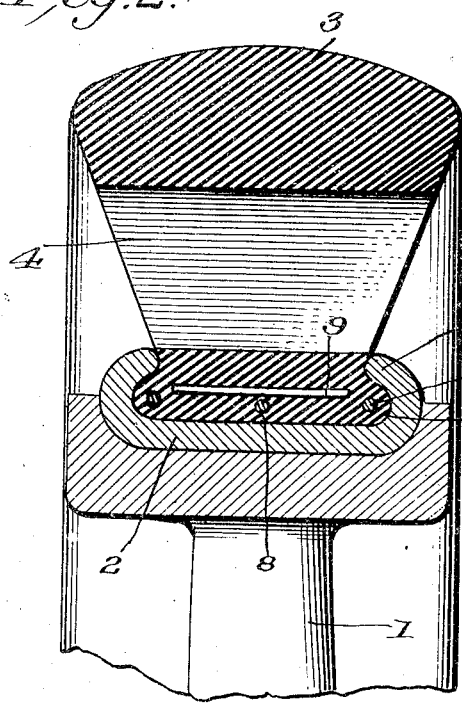
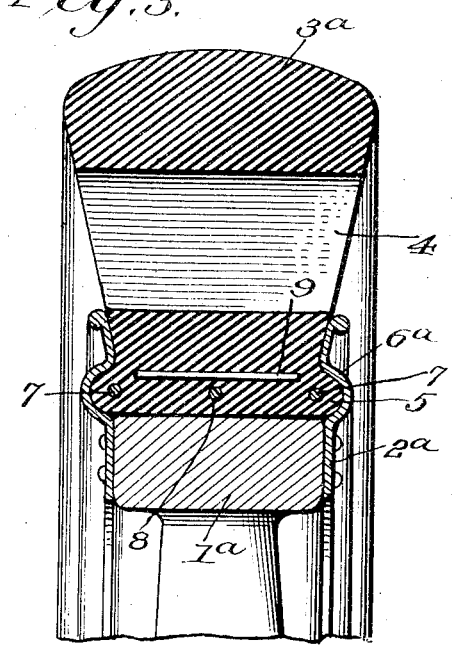
Witnesses
Jos. A. Ryan
John F. Smithers
Inventor
David A. York
By James J. Sheehy & Co.,
Attorneys.

UNITED STATES PATENT OFFICE.

DAVID A. YORK, OF NORTHGROVE, INDIANA.

RESILIENT TIRE.

1,077,782.  Specification of Letters Patent.  Patented Nov. 4, 1913.

Application filed December 7, 1912. Serial No. 735,484.

*To all whom it may concern:*

Be it known that I, DAVID A. YORK, citizen of the United States, residing at Northgrove, in the county of Miami and State of Indiana, have invented new and useful Improvements in Resilient Tires, of which the following is a specification.

My invention pertains to resilient tires for vehicle wheels; and it consists in the inexpensive, efficient and durable tire hereinafter described and definitely claimed.

In the drawings, accompanying and forming part of this specification: Figure 1 is a view, partly in elevation and partly in section of one-half of a wheel equipped with my novel tire; it being understood that the portion of the wheel not shown is identical in construction with the half illustrated. Fig. 2 is an enlarged transverse section taken through the wheel rim and the tire. Fig. 3 is a view similar to Fig. 2 and illustrating a modified construction for effecting connection of the tire to the rim of a wheel.

Similar numerals of reference designate corresponding parts in Figs. 1 and 2 of the drawings.

The wheel 1 may be provided with a rim 2 of the form shown in Fig. 2 in cross-section, or of any other form compatible with the purpose of my invention without involving departure from the scope of same as claimed.

My novel tire 3 is formed of rubber or other resilient material or composition of materials, such as known in the art, and is gradually increased in width from a point adjacent its inner edge to a point adjacent its perimeter.

The tire is rendered light in weight, kept cool and its resiliency is increased by the provision in the tire of openings 4 extending transversely through the tire, and separated by solid tire portions, as shown in Fig. 1. The said openings 4 are preferably of the shape of a truncated cone, and are arranged with their smaller ends outward. At opposite sides of its inner edge portion the tire is provided with flanges 5, designed to be arranged in and held by the inturned flanges 6 of the rim 2, as clearly shown in Fig. 2.

By reason of the tire 3 being gradually increased in width from a point adjacent to its inner edge to a point adjacent its perimeter, and being provided in its inner portion, at intervals, with transverse openings that extend throughout the width of the inner portion, it will be manifest that the tire is calculated to collapse and in that way adequately cushion a vehicle when the same is traveling over a rough road; also, that the tire characterized as stated is calculated to resume its normal state as soon as relieved of pressure and is also calculated to last and to retain its resiliency or cushioning capacity for an indefinite period.

Embedded in the flanges 5 of the tire and extending entirely around the tire are reinforcing wires 7, and embedded in the central portion of the tire, adjacent the inner edge thereof and between the wires 5, is a reinforcing wire 8, which also extends entirely around the tire. In addition to the wires 7 and 8, the tire is provided at intervals of its length with small rods or wires 9. These small wires or rods 9 are spaced apart, as shown in Fig. 1, and are arranged transversely of the tire, and with their intermediate portions at the outer side of the vertical central wire or rod 8, and with their ends extending to points adjacent the side rods or wires 7. The rods 7, 8 and 9 are possessed of resiliency, and consequently it will be manifest that while the said rods will lend increased stiffness and durability to the held inner portion of the tire, they will not preclude or materially interfere with the inner portion of the tire being bent transversely into concavo-convex shape, as is necessary to the crowding of the said inner tire portion into the rim 2. When the tire is positioned in the said rim, the side rods 7 will enable the rim flanges 6 to strongly hold the tire, and in this the said rods 7 will be assisted by the vertical central rod 8 and the transverse rods 9; the rods 9 serving, by tending to assume a straight state, as shown in Fig. 2, to crowd the tire flanges into the rim flanges. When, however, it is desired to remove the tire from the rim, the same can be accomplished by pulling outward on the tire to a sufficient degree to cause the inner portion of the tire to assume a concave shape in cross-section.

As shown in Fig. 3, the cross-section shape of the tire may be varied without departure from the scope of my claimed invention. With the exception of shape, however, the tire 3ª, shown in Fig. 3, is identical with the tire 3 of Figs. 1 and 2.

In Fig. 3, the tire-receiving and holding rim is formed by two plates 2ª, fixed to opposite sides of the wheel felly 1ª, and having flanges 6ª shaped to receive the tire flanges 5.

It will be gathered from the foregoing that my novel tire, while simple and inexpensive, is highly resilient and embodies no features that are liable to wear out or become impaired after a short period of use; and it will also be manifest that my novel tire is highly resilient, and is therefore calculated to adequately absorb shock and jar and prevent the transmission of the same through the wheel to the vehicle equipped with the wheel.

The transverse rods or wires 9 are arranged in the tire at points between the transverse openings of the tire. By virtue of said relative arrangement the rods or wires 9 will stiffen the portions of the tire base at opposite sides of the transverse openings, in the direction of the width of said base, without detracting from the resiliency of those portions of the tire that are in the same radial planes as the transverse openings. It will also be observed that the reinforcing wires 7 and 8 extending entirely around the tire serve effectually to prevent undue spreading of the tire portions between the transverse openings in the direction of the length of the tire, and in that way contribute materially to the resiliency of the tire and at the same time prolong the usefulness thereof. It will further be observed that the wires 7 and 8 are spaced from each other and from the transverse rods or wires 9 as is necessary to enable the wires 7 and 8 and the rods 9 to perform the respective functions ascribed to the same when used in a tire having spaced transverse openings extending throughout the width thereof.

Having described my invention, what I claim and desire to secure by Letters-Patent, is:

The combination with a tire formed of resilient material and having spaced transverse openings in its inner portion extending throughout its width and also having flanges at the sides of its inner edge portion; of circular side rods embedded in the said flanges of the tire, a central circular rod embedded in the inner edge portion of the tire, and spaced transverse rods embedded in the inner edge portion of the tire at the outer side of and spaced from the central rod and side rods, and having their ends disposed adjacent the side rods, the several rods being resilient, and the transverse rods being arranged at points between the transverse openings of the tire.

In testimony whereof I have hereunto set my hand in presence of two subscribing witnesses.

DAVID A. YORK.

Witnesses:
CHARLES M. PETTY,
T. G. STEWART.

---

Copies of this patent may be obtained for five cents each, by addressing the "Commissioner of Patents, Washington, D. C."